United States Patent [19]
Cunningham et al.

[11] Patent Number: 5,859,739
[45] Date of Patent: Jan. 12, 1999

[54] MAGNETIC DATA READING APPARATUS AND METHOD USING INDUCTIVE AND MAGNETORESISTIVE HEADS

[75] Inventors: Earl Albert Cunningham; Jodie Ann Christner, both of Rochester, Minn.

[73] Assignee: International Business Machines Corporation, Armonk, N.Y.

[21] Appl. No.: 640,530

[22] Filed: May 1, 1996

[51] Int. Cl.[6] .................................................. G11B 5/02
[52] U.S. Cl. .......................................... 360/67; 360/77.08
[58] Field of Search .................................. 360/67, 77.08, 360/46, 75, 77.02

[56] References Cited

U.S. PATENT DOCUMENTS

| | | |
|---|---|---|
| 4,504,880 | 3/1985 | Church et al. . |
| 5,430,584 | 7/1995 | Petersen . |
| 5,463,603 | 10/1995 | Petersen .............................. 360/67 X |

FOREIGN PATENT DOCUMENTS

| | | |
|---|---|---|
| 0 100 841 A1 | 2/1984 | European Pat. Off. . |
| 0 643 479 A1 | 3/1994 | European Pat. Off. . |
| 3-201203 | 9/1991 | Japan . |
| 3-201204 | 9/1991 | Japan . |

OTHER PUBLICATIONS

IBM Technical Disclosure Bulletin, vol. 38, No. 9, Sep. 1995, New York, US, pp. 409–410, XP000540312 Anonymous: "Servo–Burst Pattern Read by Write Element".
Idema MR Head/Technology Symposium, Feb. 2, 1994, Santa Clara, CA.

*Primary Examiner*—Aristotelis M. Psitos
*Assistant Examiner*—James L. Habermehl
*Attorney, Agent, or Firm*—Joan Pennington; Matthew J. Bussan; Philip M. Kolehmainen

[57] ABSTRACT

A rigid disk drive unit includes head assemblies having both inductive and magnetoresistive heads. When information is read from a disk surface, signals from the inductive head and the magnetoresistive head are combined to provide an output signal, thereby to overcome disadvantages of using either signal alone. The relative contributions of the magnetoresistive and inductive signals are varied to optimize performance depending on the radial position of the head assembly over a magnetic disk and upon whether the information being read is data or servo position information. The inductive signal is ignored during data recovery procedure head shift operations.

19 Claims, 2 Drawing Sheets

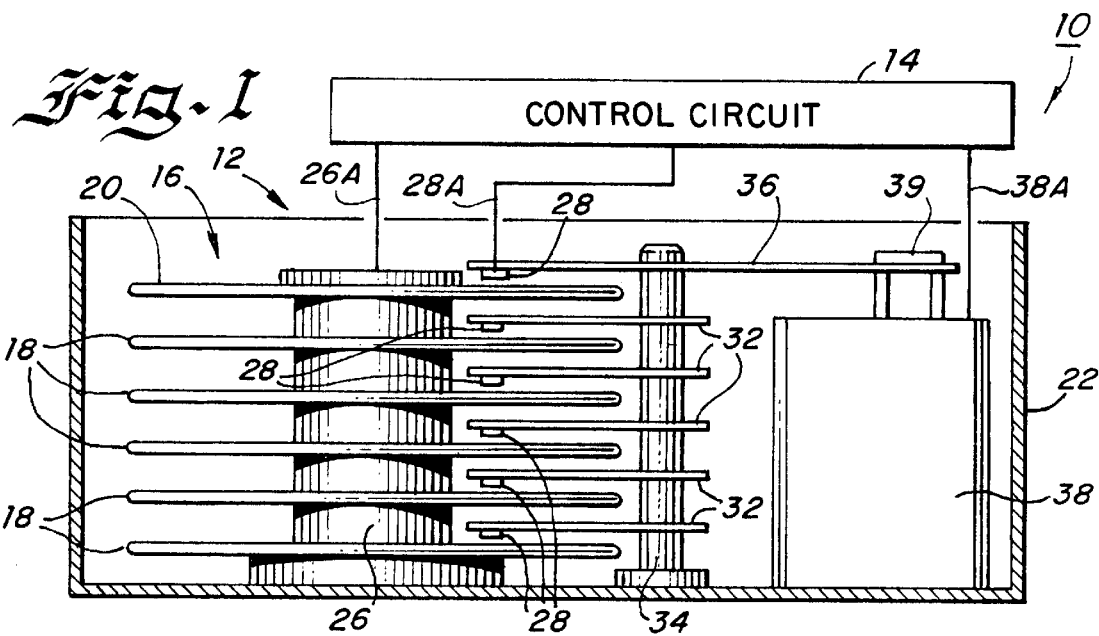
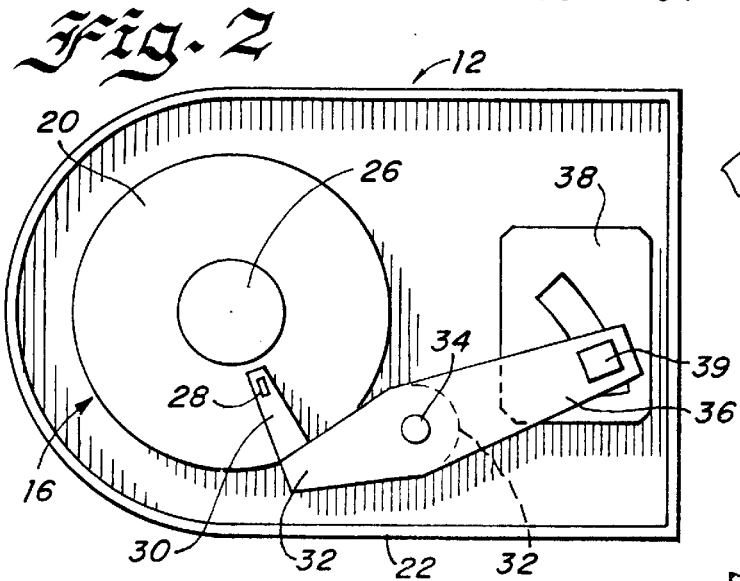
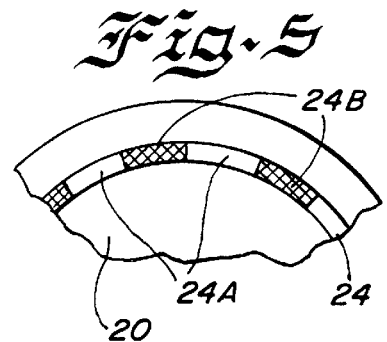
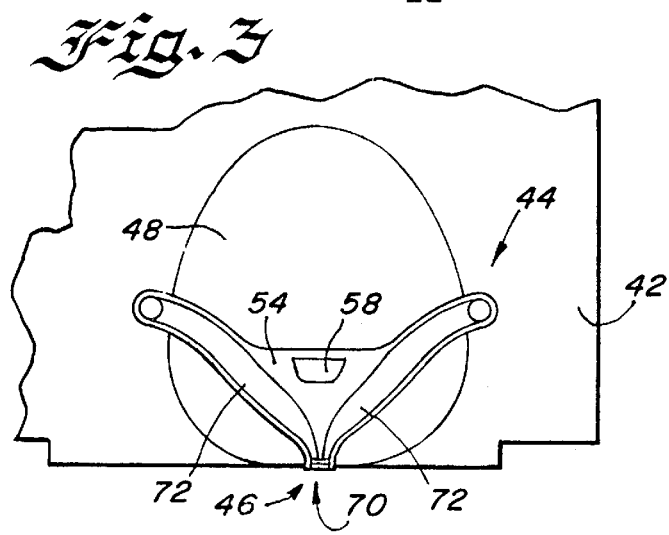
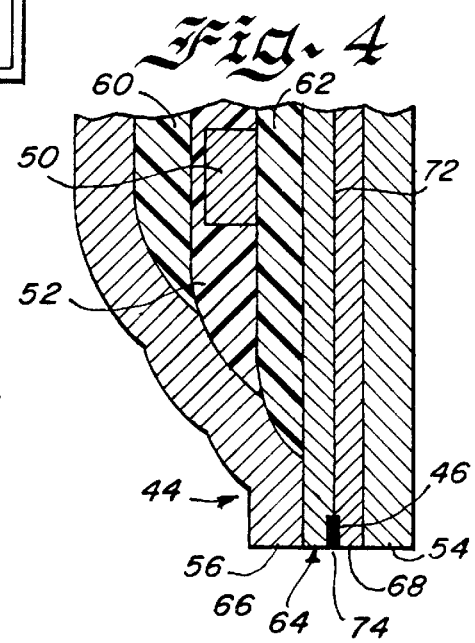

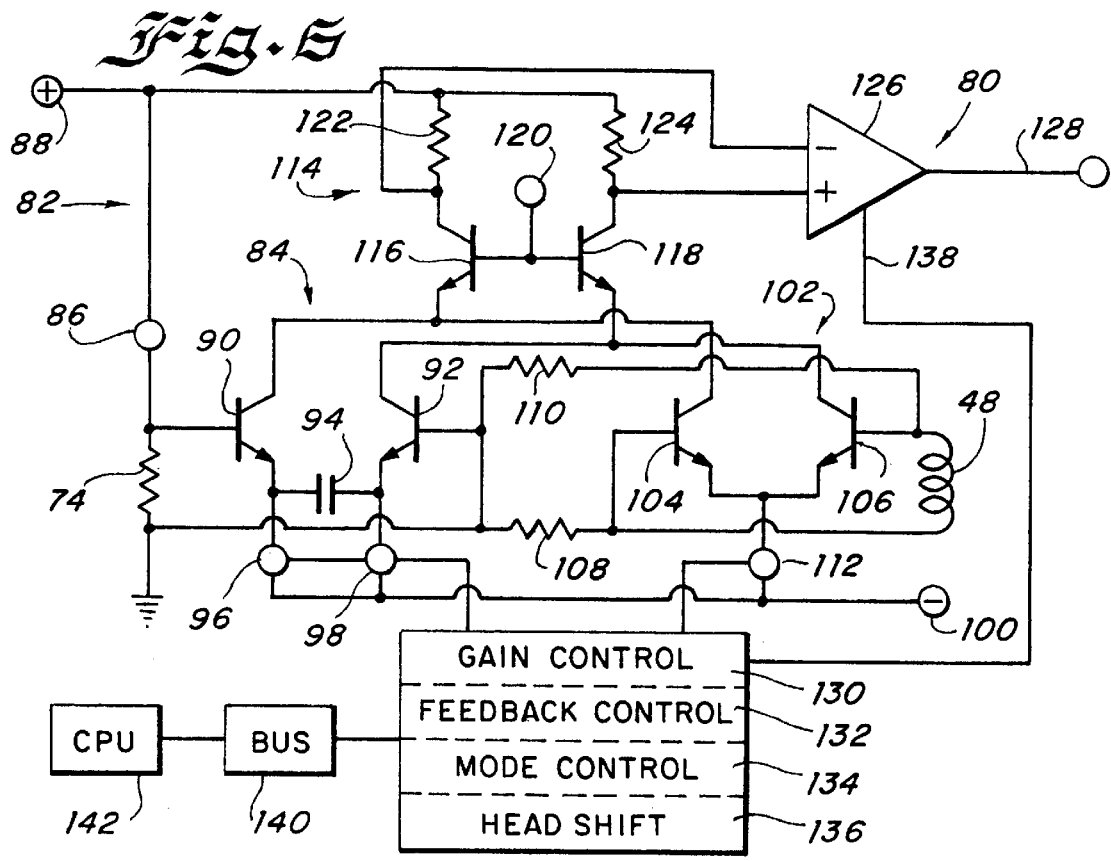
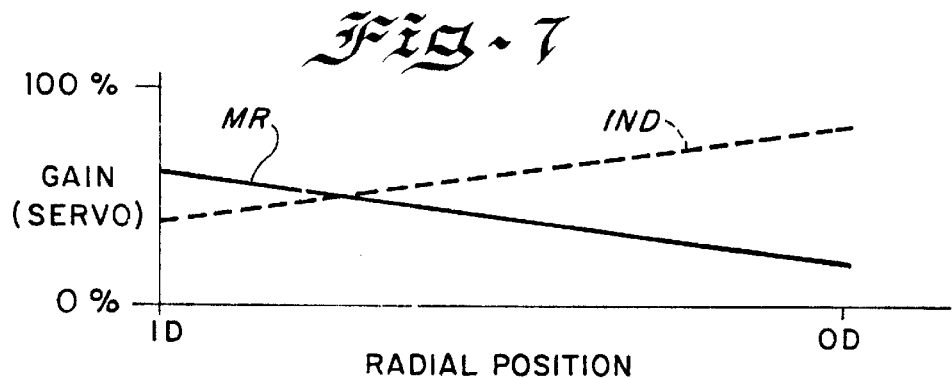
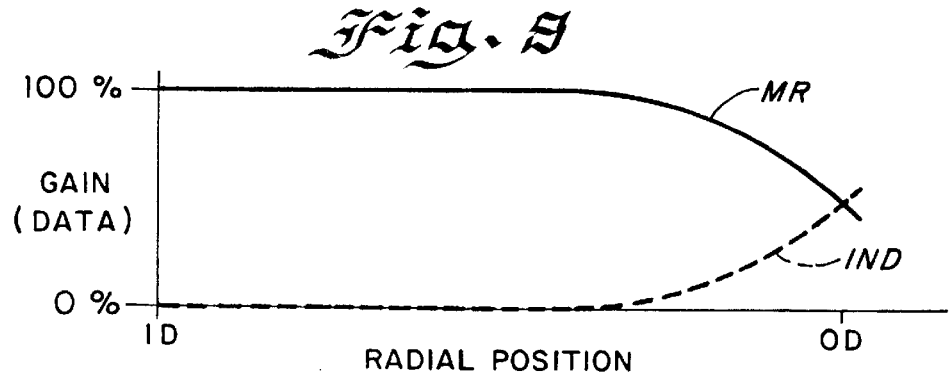

MAGNETIC DATA READING APPARATUS AND METHOD USING INDUCTIVE AND MAGNETORESISTIVE HEADS

FIELD OF THE INVENTION

The present invention relates to reading magnetic data, and more particularly to apparatus and methods using both electromagnetic and magnetoresistive heads.

DESCRIPTION OF THE PRIOR ART

Computers typically include one or more memory storage devices such as direct access storage devices or DASDs having media upon which data can be written and from which data can be read. A widely used DASD is a disk drive unit including rigid disks with magnetic recording surfaces. A disk is rotated at a high speed, and a transducer head assembly is moved relative to the disk axis to align the head with data storage regions or bands on the disk surface. The transducer head is supported by an air bearing head slider and floats closely above the disk surface so that data is written or read without physical contact between the head and the disk surface. The information magnetically stored on a disk surface typically includes both customer data and servo position information.

In a common implementation, a number of parallel, spaced apart disks are rotated simultaneously and a number of ganged head assemblies are moved across the rotating disk surfaces by a servo motor. Servo positioning information is read by the transducer head assemblies to provide feedback information used in operating the servo motor in order to align the transducer heads with addressable data storage locations on the disks. The disk drive unit therefore includes head assemblies that read both servo position information and stored data as well as writing data to the disk.

In the past, disk drive units used electromagnetic transducer assemblies for writing and for reading data. A typical electromagnetic transducer was an inductive head with a winding and spaced apart metal pole pieces forming a magnetic gap for either writing data to a disk surface or reading data from the disk surface. As computer data storage densities and operating speeds have increased, electromagnetic head designs have evolved. A typical modern electromagnetic head is a miniature thin film construction incorporating a winding, leads and closely spaced poles.

There has been a trend toward using magnetoresistive transducer heads for reading stored data because magnetoresistive heads have characteristics that have been recognized as suited for reading magnetically recorded data. A magnetoresistive head includes a small sensor that defines an effective read zone or gap that is narrower than the pole to pole spacing of a thin film inductive head. Resistance variations in the magnetoresistive material resulting from the magnetic flux from the disk provide a relatively large signal amplitude that is relatively constant as the head reads data at different radial distances from the disk axis.

It has been proposed to combine a thin film inductive head and a magnetoresistive head into a single head assembly wherein the inductive head is used for writing data to the disk surface and the magnetoresistive head is used to read data and servo position information from the disk. U.S. Pat. No. 4,504,880 discloses an integrated magnetic head assembly including an inductive write subassembly and a magnetoresistive read subassembly. In the assembly of that patent, the magnetoresistive material is located in the gap between pole pieces of the inductive head.

In conventional use of head assemblies having magnetoresistive read heads and inductive write heads, the head assembly registers with information storage tracks including data segments where data is stored interspersed with servo information segments where servo information is stored. In a data read operation, the magnetoresistive head alternately reads servo information and data. In a data write operation, the magnetoresistive head reads servo information and the inductive head writes data. A control such as an on board or remote CPU provides synchronization information for switching the head assembly between data and servo information functions.

Although a magnetoresistive head has advantages for reading data, the known integrated head assembly system has disadvantages. The signal provided by a magnetoresistive head has relatively constant or somewhat decreasing amplitude across the disk radius, and it is not practical to take full advantage of the banding procedure at the outer diameter. The narrow magnetoresistive head provides a signal that is not symmetrical in the cross track direction and thus servo linearity is decreased. The narrow read width of a magnetoresistive head makes it susceptible to small media defects and to servo irregularities such as erase band gaps.

The read signal provided by a magnetoresistive head is typically processed by a preamplifier to provide an output signal useful to a computer. A preamplifier module (the SSI 32R1540 MR Preamp) was disclosed during an IDEMA Head/Technology Symposium on Feb. 2, 1994 by T. Ward of Silicon Systems. That module included a preamplifier with voltage sensitive amplifiers for magnetoresistive head signals with corresponding bias and a coupling capacitor between the first stage emitters. The circuit also included preamplifiers to read the signals from inductive heads that could be used in place of the signal from the magnetoresistive head preamplifiers to read servo information.

SUMMARY OF THE INVENTION

A principal object of the present invention is to provide improved apparatus and methods for reading magnetically recorded information in which disadvantages of conventional head assemblies are overcome. Other objects are to provide apparatus and methods in which performance is optimized at different radial positions of a magnetic disk; to provide apparatus and methods in which performance is optimized for both data and servo reading functions; to provide apparatus and methods in which the susceptibility of a head assembly to surface defects is decreased; to provide apparatus and methods in which difficulties with asymmetry and instability are reduced; to provide apparatus and methods in which servo information is read with both off track capability and servo linearity; to provide apparatus and methods in which banding capability during data reading operations is improved near the outer disk radius; and to provide apparatus and methods overcoming disadvantages of magnetic data reading apparatus and methods used in the past.

In brief, in accordance with the present invention, there is provided a data storage device including a housing. A magnetic data storage medium including an information storage region is contained in the housing. A magnetically recorded stream of information is on the information storage region. A transducer head assembly is contained in the housing. An actuator is connected to the transducer head assembly for moving the transducer head assembly relative to the data storage medium. A controller is connected to the actuator for locating the transducer head assembly in registration with the information storage region. The transducer head assembly includes a magnetoresistive head and an electromagnetic head superimposed for simultaneous registration with the information stream. A preamplifier is connected to the transducer head assembly for processing signals read from the information storage region. The data storage device is characterized by the preamplifier including signal processing means for simultaneously processing signals read by both the magnetoresistive head and the electromagnetic head.

In brief, in accordance with another aspect of the present invention there is provided a method for reading from a magnetic medium having a storage region including a stream of recorded information. The method includes positioning a magnetoresistive head in registration with the storage region and superimposing an electromagnetic head with the magnetoresistive head in registration with the storage region. The information stream is read simultaneously with both the magnetoresistive head and the electromagnetic head. An output signal is provided by combining the signals from both the magnetoresistive head and the electromagnetic head.

BRIEF DESCRIPTION OF THE DRAWINGS

The present invention together with the above and other objects and advantages may best be understood from the following detailed description of the preferred embodiment of the invention illustrated in the drawings, wherein:

FIG. 1 is a partly schematic and simplified elevational view of a data storage disk file embodying the present invention;

FIG. 2 is a partly schematic and simplified plan view of the data storage disk file of FIG. 1;

FIG. 3 is an enlarged, fragmentary rear view of a transducer head assembly of the data storage disk file of FIG. 1;

FIG. 4 is a greatly enlarged cross sectional view of part of the transducer head assembly of FIG. 3;

FIG. 5 is a plan view of a fragment of a surface of a rigid disk of the disk file of FIG. 1;

FIG. 6 is a schematic diagram of a preamplifier circuit for the transducer head assembly;

FIG. 7 is a graph showing allocation of the relative gains of amplifier stages of the preamplifier circuit of FIG. 5 during reading of servo position information; and FIG. 8 is a graph showing allocation of the relative gains of amplifier stages of the preamplifier circuit of FIG. 6 during reading of data information

DETAILED DESCRIPTION OF THE PREFERRED EMBODIMENTS

Having reference now to the drawings, in FIG. 1 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is mounted on a flexure spring 30 carried by an arm 32. The arms 32 are ganged together for simultaneous pivotal movement about a support spindle 34. One arm 32 includes an extension 36 driven in pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

In FIG. 5 there is seen a fragment of one disk surface 20. A portion of a single one of numerous information storage tracks 24 is indicated schematically and not to scale. The track 24 includes data storage segments 24A interspersed with and separated by servo segments 24B. Each disk surface 20 includes a large number of tracks 24, each including data storage segments 24A where customer data channeled through the control unit 14 may be written and read. The segments 24A are separated by servo segments 24B where bursts of servo information are prerecorded.

Referring now to FIGS. 3 and 4, there is shown in simplified form, and not to scale, portions of one of the transducer head assemblies 28. The assembly 28 is an integrated magnetoresistive and inductive head combination, preferably as disclosed in U.S. Pat. No. 4,504,880, incorporated herein by reference. That patent may be consulted for a more detailed description of the transducer head assembly 28 beyond that helpful to understanding the present invention.

The assembly 28 includes an air bearing head slider 42 that floats above a corresponding rotating disk surface 20. An inductive head assembly 44 and a magnetoresistive head assembly 46 are supported by the slider 42. The inductive head assembly 44 is fabricated by a thin film process, and includes a generally planar coil 48, the outline of which is seen in FIG. 3. The coil 48 includes a number of turns 50, part of one of which is seen in FIG. 4, enclosed within a layer 52 of insulating material. The coil 48 loops through a pair of pole pieces 54 and 56 and a back gap closure 58. A pair of additional insulating layers 60 and 62 cover the coil 48.

The pole pieces 54 and 56 are separated by an inductive transducing gap 64. The gap 64 contains a pair of insulating gap layers 66 and 68. Between the layers 66 and 68 are disposed components of the magnetoresistive head assembly 46 including conductors 72 and a magnetoresistive sensor stripe 74. The pole pieces 54 and 56 serve as the shields for the magnetoresistive sensor 74. Because the magnetoresistive sensor 74 is located generally in the center of the inductive gap 64, the inductive head assembly 44 and the magnetoresistive head assembly 46 are superimposed and register simultaneously with information magnetically stored along a track 24 of a disk surface 20.

In accordance with the present invention, the inductive head assembly 44 and the magnetoresistive head assembly 46 of each head assembly 28 are used in concert to read data and servo information from a disk surface 20. FIG. 6 is a schematic diagram of a circuit 80 including a preamplifier 82 for processing read signals from both head assemblies 44 and 46 of one of the head assemblies 28 in order to achieve improved servo and data reading operations from information storage tracks 24 at all radial locations over the disk 18.

The preamplifier 82 includes a first preamplifier stage 84 for the magnetoresistive head sensor 74. Bias current for the magnetoresistive sensor 74 is provided by a current source 86 connected in series with the sensor 74 between a positive supply voltage terminal 88 and a point of ground potential. The voltage across the sensor 74 is read by a differential pair of transistors 90 and 92 having their emitters AC coupled by a capacitor 94 to provide for the DC offset of the voltage across the magnetoresistive sensor 74. The gain of this first preamplifier stage 84 is set by a pair of commonly controlled bias current sources 96 and 98. The current sources 96 and 98 are connected respectively between the emitters of the transistors 90 and 92 and a negative power supply terminal 100. Two separate current sources 96 and 98 are used to permit a DC voltage across the coupling capacitor 94.

A second preamplifier stage 102 for the inductive head 46 includes a pair of transistors 104 and 106 having their bases connected to the thin film inductive coil 48 to amplify the output signal from the inductive head 46. A pair of resistors 108 and 110 connected between ground and the bases of the transistors 104 and 106 provide base current for the transistors and maintain the DC level of the coil 48 near ground potential. The gain of this second preamplifier stage is set by a bias current source 112 connected between the negative voltage terminal 100 and the emitters of the transistors 104 and 106.

The signals from both the first and second amplifier stages 84 and 102 are combined and supplied to a common third amplifier stage 114 including a CASCODE connected pair of transistors 116 and 118 having their bases connected to a reference voltage terminal 120. Current from transistors 90 and 104 passes through transistor 116 and through a load resistor 122. Current from the transistors 92 and 106 passes through transistor 118 and a load resistor 124. Thus the first and second stages 84 and 102 are parallel to one another and both are in series with the third stage 114. The positive and negative preamplifier output signals at the collectors of CASCODE transistors 116 and 118 are connected to one or more further amplification stages 126. A circuit output 128 provides an output signal that is made up of components originating with the magnetoresistive sensor 74 and components originating with the inductive head assembly 44.

In accordance with the invention there is provided a gain control 130 that regulates the gain of amplifier stages 84 and 102 by controlling the operating level of the bias current sources 96, 98 and 112. The gain control 130 includes a feedback control 132 for regulating the aggregate gain of the preamplifier 82, a mode control 134 for operating the preamplifier 82 either for servo or data operations and a head shift control 136 for overriding normal operation in the case of a data recovery procedure including a head shift operation.

The feedback control 132 adjusts the bias current sources 96, 98 and 112 to maintain a constant, or at least a maximum, DC current flow through the load resistors 122 and 124. The DC output level of the preamplifier output is detected at the input of the amplifier 126 and returned by a line 138 to the gain control 130. Variables such as thermal resistance changes are compensated for and the overall gain of the stages 84, 102 and 114 is maintained at a desired constant level.

The mode control 134 optimizes operation of the preamplifier in accordance with the radial position of the head assembly 28 and in accordance with whether the head assembly is in registration with a data sector 24A or a servo sector 24B of a storage track 24. The gain control 130 is connected by a data bus 140 to a central processing unit (CPU) 142 and is supplied with timing information to synchronize amplifier operation with data and servo band segments and also with radial head position information. The CPU 142 for example may be onboard the data storage disk file 10 and incorporated into the control unit 14 or may be remote from the file 10.

For reading servo information, the total gain of the first and second amplifier stages 84 and 102 is allocated in proportions that vary depending on the radial position of the head assembly 28 over the disk surface 20. The allocation method can be seen in FIG. 7 where the contribution of the signal from the magnetoresistive head 46 is indicated by a solid line and the contribution of the signal from the inductive head 44 is indicated by a broken line. The total, or 100 percent, is the sum of the two at any radial position. The vertical axis represents the percentages of signal contribution and the horizontal axis represents the radial position of the head assembly 28 over the disk surface 20.

At the inner diameter (ID) of the disk surface, the gain of the amplifier stage 84 contributes somewhat more than half of the total gain of the first and second stages 84 and 102. Conversely the gain of the amplifier stage 102 contributes somewhat less than half. The contributions are equal at a location roughly one-fifth of the way from the INNER DIAMETER. At the outer diameter (OD) of the surface 20, the gain of the amplifier stage 102 constitutes nearly all of the total, while the contribution of the stage 84 is relatively small. These relative contributions result from bias current levels set by regulation of current sources 96, 98 and 112 by the gain control 130.

In reading servo sectors 24B, the combination of the inductive and magnetoresistive signals provides a cross track profile that has a consistent high central amplitude due to the magnetoresistive sensor 74. Sensitivity at a lower amplitude is provided beyond the magnetoresistive gap width by addition of signal from the inductive head. The resulting center loaded, relatively wide sensitivity profile is advantageous for reading servo data reliably and linearly. For example, the combined signal is well suited for averaging over erase band gaps in the recording.

For reading data information from data segments 24A, the total gain of the first and second amplifier stages 84 and 102 is also varied depending on the radial position of the head assembly 28 over the disk surface 20. The allocation method can be seen in FIG. 8. Comparing FIGS. 7 and 8, it can be seen that different gain control approaches are used for data and servo reading. The preamplifier is synchronized with radial track position in accordance with signals provided by the CPU 142.

For radial positions extending from the disk surface INNER DIAMETER to well over half way to the disk OUTER DIAMETER, only the first amplifier stage 84 is used, and the gain of the amplifier stage 102 is set to zero. As the head assembly 28 approaches the OUTER DIAMETER of the surface 20, the gain of the amplifier stage 102 is increased. At the OUTER DIAMETER, the contribution of the amplifier stage 102 is slightly more than half.

The magnetoresistive head 46 is effective in reading data when it is not near the OUTER DIAMETER of the disk surface 20. However, the magnetoresistive head 46 provides a signal dependent on flux and independent of speed, while the inductive head assembly 44 provides a signal with an amplitude that increases with increased speed of head travel over the disk surface. Approaching the disk surface OUTER DIAMETER, the tracks 24 and the data segments 24A are longer and relative head speed increases. Using the inductive signal in these regions in addition to the magnetoresistive signal permits efficient banding of data, i.e., increasing the frequency of data along the track segments 24A to maintain constant linear density with increasing disk velocity at larger radii.

Although the curves in FIG. 7 are generally indicated as linear, other gain allocation approaches may be used. Similarly, the nonlinear curves seen in parts of FIG. 8 may be linear or partly linear if desired. In addition, although the curves in FIGS. 7 and 8 are continuous, a step function approach may be used instead. For example, the gains may be adjusted in steps at radial distances corresponding to a data banding scheme used with the file.

Other advantages flow from combining the signals of the magnetoresistive and inductive heads 46 and 44. The narrow sensitivity track of the magnetoresistive head 46 renders it susceptible to relatively small media defects. Supplementing the magnetoresistive signal with the inductive signal improves the ability of the head assembly to tolerate media defects because of the wider area of sensitivity of the inductive head 44. In addition, the asymmetric magnetoresistive output signal is improved by adding the symmetrical inductive signal.

There are situations where the off track sensing capability of the magnetoresistive head 46 is of paramount importance. In a data recovery procedure when attempting to recover from a data read failure, one step in the procedure may involve shifting the head assembly 28 in the radial direction by a fraction of one track width. In this procedure, the wide read gap of the inductive head can cause problems due to side interference. The gain control 130 therefore includes a head shift control 136 that operates in response to data recovery procedure instructions received from the CPU 142 and bus 140 to decrease the gain of the inductive signal to zero and to control the gain of the magnetoresistive amplifier stage 84 to provide all of the gain.

While the present invention has been described with reference to the details of the embodiments of the invention shown in the drawing, these details are not intended to limit the scope of the invention as claimed in the appended claims.

What is claimed is:

1. A data storage device comprising in combination:
   housing means;
   a magnetic data storage medium including an information storage region contained in said housing means;
   a magnetically recorded stream of information on said information storage region;
   a transducer head assembly contained in said housing means;
   actuator means connected to said transducer head assembly for moving said transducer head assembly relative to said data storage medium;
   control means connected to said actuator means for locating said transducer head assembly in registration with said information storage region;
   said transducer head assembly including a magnetoresistive head and an electromagnetic head;
   said magnetoresistive head and said electromagnetic head being superimposed for simultaneous registration with said information stream;
   and a preamplifier connected to said transducer head assembly for processing signals read from said information storage region;
   said data storage device being characterized by:
      said preamplifier including signal processing means for providing an output signal by simultaneously processing signals read by both said magnetoresistive head and said electromagnetic head;
      said signal processing means including a first amplifier means connected to said magnetoresistive head and second amplifier means connected to said electromagnetic head, and adjustable gain control means for independently setting the gains of said first and second amplifier means to vary the relative contribution of said magnetoresistive and inductive heads to said output signal.

2. A data storage device as claimed in claim 1, said electromagnetic head comprising an inductive head with a coil and a gap, and said magnetoresistive head having a magnetoresistive sensor located in said gap.

3. A data storage device as claimed in claim 2, said magnetoresistive sensor being located in the center of said gap.

4. A data storage device as claimed in claim 2, said gap being defined by a pair of pole pieces, said pole pieces further comprising shields for said magnetoresistive sensor.

5. A data storage device as claimed in claim 1, said magnetic medium comprising a rotatable magnetic disk, said information storage region comprising a surface of said disk, and said transducer head assembly including an air bearing head slider supporting said magnetoresistive head and said electromagnetic head over said disk surface.

6. A data storage device as claimed in claim 5, further comprising means responsive to the radial location of said transducer head assembly on said disk surface for varying the gain of at least one of said first and second amplifier means.

7. A data storage device as claimed in claim 5, further comprising means responsive to the radial location of said transducer head assembly on said disk surface for allocating the relative gains of said first and second amplifier means.

8. A data storage device as claimed in claim 5, said data storage device including means for disabling said second amplifier means during a head shift recovery procedure.

9. A data storage device as claimed in claim 5, said information stream including data segments and alternating servo segments, and said gain control means including means for setting said gains to first and second operating modes respectively in response to registration of said head assembly with said data and servo segments.

10. A data storage device as claimed in claim 1, said signal processing means further comprising third amplifier means connected to said first and second amplifier means.

11. A data storage device as claimed in claim 10 further comprising a feedback path connected between said third amplifier means and said gain control means, and said gain control means including means for regulating the total gain of said first, second and third amplifier means.

12. Apparatus for reading data information and servo information from tracks of a magnetic surface of a rotating magnetic data storage disk, said apparatus comprising:

an integrated head assembly including a magnetoresistive head and a superimposed electromagnetic head;

amplifier means for simultaneously processing signals from said magnetoresistive head and electromagnetic head;

said amplifier means including a first stage having an input connected to said magnetoresistive head and having an output, a second stage parallel to said first stage having an input connected to said electromagnetic head and having an output, and a third stage having an input connected to receive a combined signal from said outputs of first and second stages; and gain control means for adjusting the gain of said first and second stages independently of one another to vary the relative contribution of said magnetoresistive and inductive heads to said combined signal.

13. The apparatus of claim 12, said gain control means including means for allocating an aggregate gain of said first and second stages between said first and second stages in accordance with radial position of said head assembly relative to the magnetic disk surface.

14. The apparatus of claim 13, said allocating means including mode control means for making different allocations for servo and data information respectively.

15. The apparatus of claim 12, said allocating means increasing the relative gain of said second stage in response to increasing radial position of said head assembly relative to the magnetic disk surface.

16. The apparatus of claim 12, said gain control means including head shift control means for discontinuing gain of said second stage in response to a head shift data recovery procedure.

17. A method for reading from a magnetic medium having a storage region including a stream of recorded information, said method comprising:

positioning a magnetoresistive head in registration with the storage region;

superimposing an electromagnetic head with the magnetoresistive head in registration with the storage region;

simultaneously reading the information stream with both the magnetoresistive head and the electromagnetic head;

providing an output signal by combining the signals from both the magnetoresistive head and the electromagnetic head; and preamplifying the signals from both the magnetoresistive head and the electromagnetic head before said combining step;

said preamplifying step including adjusting the relative contribution of said signals from the magnetoresistive head and the electromagnetic head depending on the radial position of the transducer head assembly on the disk.

18. A method for reading from a magnetic medium having a storage region including a stream of recorded information, said method comprising:

positioning a magnetoresistive head in registration with the storage region;

superimposing an electromagnetic head with the magnetoresistive head in registration with the storage region;

simultaneously reading the information stream with both the magnetoresistive head and the electromagnetic head;

providing an output signal by combining the signals from both the magnetoresistive head and the electromagnetic head; and preamplifying the signals from both the magnetoresistive head and the electromagnetic head before said combining step;

said preamplifying step including disabling the signal from the electromagnetic head during a head shift data recovery procedure.

19. A method for reading from a magnetic medium having a storage region including a stream of recorded information, said method comprising:

positioning a magnetoresistive head in registration with the storage region;

superimposing an electromagnetic head with the magnetoresistive head in registration with the storage region;

simultaneously reading the information stream with both the magnetoresistive head and the electromagnetic head;

providing an output signal by combining the signals from both the magnetoresistive head and the electromagnetic head; and preamplifying the signals from both the magnetoresistive head and the electromagnetic head before said combining step;

said preamplifying step including detecting whether the information stream being read is data or servo, and adjusting the relative contribution of said signals from the magnetoresistive head and the electromagnetic head depending on whether the information stream being read is data or servo.

* * * * *